(12) United States Patent
Kim et al.

(10) Patent No.: US 7,083,110 B2
(45) Date of Patent: Aug. 1, 2006

(54) WINDOW HAVING A VENTILATION EQUIPMENT

(75) Inventors: Seung Woo Kim, Seoul (KR); Sung Joo Cho, Seoul (KR)

(73) Assignee: Lidartech Co., Ltd., Seoul (KR)

( * ) Notice: Subject to any disclaimer, the term of this patent is extended or adjusted under 35 U.S.C. 154(b) by 23 days.

(21) Appl. No.: 10/797,592

(22) Filed: Mar. 10, 2004

(65) Prior Publication Data

US 2004/0253917 A1 Dec. 16, 2004

(30) Foreign Application Priority Data

Jun. 12, 2003 (KR) .................. 10-2003-0037801
Nov. 25, 2003 (KR) .................. 10-2003-0084109

(51) Int. Cl.
*F24F 7/00* (2006.01)

(52) U.S. Cl. .................. 237/46; 454/200; 454/208

(58) Field of Classification Search ................ 454/200, 454/208, 211, 212, 219, 222
See application file for complete search history.

(56) References Cited

U.S. PATENT DOCUMENTS

| | | | | |
|---|---|---|---|---|
| 547,996 | A | * | 10/1895 | Iliowizi ...................... 454/200 |
| 809,228 | A | * | 1/1906 | Stephens .................... 454/198 |
| 1,503,089 | A | * | 7/1924 | Callahan ...................... 165/54 |
| 2,152,614 | A | * | 3/1939 | Younger ...................... 219/473 |
| 2,373,497 | A | * | 4/1945 | Paiste, Jr. .................... 417/315 |
| 2,598,774 | A | * | 6/1952 | Fields et al. ................. 454/200 |
| 3,259,053 | A | * | 7/1966 | Steel ........................... 454/200 |
| 3,275,224 | A | * | 9/1966 | Bush ............................ 454/200 |
| 3,570,386 | A | * | 3/1971 | Baumann et al. ........... 454/212 |
| 4,643,246 | A | * | 2/1987 | Ikemura et al. ............... 165/54 |
| 5,525,107 | A | | 6/1996 | Shao |

FOREIGN PATENT DOCUMENTS

| | | |
|---|---|---|
| DE | 3347028 | 7/1985 |
| DE | 19908571 | 9/2002 |
| EP | 0 458 725 A1 | 11/1991 |
| EP | 0 935 047 B1 | 8/1999 |
| SE | 429251 | 8/1983 |

* cited by examiner

*Primary Examiner*—Derek S. Boles
(74) *Attorney, Agent, or Firm*—Nixon Peabody LLP (57) ABSTRACT

The present invention relates to a window having ventilation equipment. The window having ventilation equipment according to the present invention includes a window frame formed with a mounting hole penetrating from outdoor side to indoor side, a casing which can be fastened to or unfastened from the mounting hole of the window frame, an outdoor air suction opening formed at a position of the outdoor side surface of the casing, an outdoor air exhaust opening formed at a position of the indoor side surface of the casing, an outdoor air flow passage formed within the casing for interconnecting the outdoor air suction opening with the outdoor air exhaust opening to each other, a first fan provided in the outdoor air flow passage for inhaling outdoor air forcibly from the outdoor air suction opening and blowing it to the outdoor air exhaust opening, an indoor air suction opening formed at another position of the indoor side surface of the casing, an indoor air exhaust opening formed at another position of the outdoor side surface of the casing, an indoor air flow passage formed with a wall partitioned against the outdoor flow passage for interconnecting the indoor air suction opening with the indoor air exhaust opening to each other, and a second fan provided in the indoor air flow passage for inhaling indoor air forcibly from the indoor air suction opening and blowing it to the indoor air exhaust opening.

7 Claims, 10 Drawing Sheets

WINDOW HAVING A VENTILATION EQUIPMENT

FIELD OF INVENTION

The present invention relates to a window having ventilation equipment, more particularly, to a window having ventilation equipment to purify external air with a cleaning filter, thereby maintaining indoor air in an optimal condition.

BACKGROUND OF THE INVENTION

In general, a window installed in the building can provide various functions, such as ventilating polluted indoor air, looking outside as well as having natural lighting within the building.

Such a window includes a window frame which is provided in the building, and a window door of sliding or hinged type which is provided with the window frame. In casing of conventional windows with the above-mentioned construction, ventilation is enabled by opening a window in such a manner that outdoor air is inhaled directly into the building for ventilating indoor air.

Ventilation using such conventional windows has an advantage that indoor air can be ventilated within a short period of time through opening windows; however, it has a problem in that outdoor noise travels into the building.

Also, there is a problem that indoor air may be polluted by an intake of outdoor smoke, smog, yellow dust, pollen, etc. when a window is opened for ventilation.

Furthermore, while ventilating by opening windows in the winter season, there is a problem that room temperature decreases rapidly by an intake of cold outdoor air into the building, thereby consuming additional energy for operating heating system additionally to increase the reduced room temperature.

SUMMARY OF THE INVENTION

It is an object of the invention to provide a window having ventilation equipment for ventilating indoor air without opening the window.

It is another object of the invention to provide a window having ventilation equipment for flowing purified outdoor air into the building while ventilating indoor air.

It is a still another object of the invention to provide a window having ventilation equipment for flowing conditioned air into the building through thermal exchange by using the difference in temperature between indoor air flowing to the outside and outdoor air flowing into the inside while it is ventilating.

It is a still further object of the invention to provide a window having ventilation equipment for heating air up by means of solar radiant heat while it is ventilating.

In order to achieve the above-mentioned objects, a window having ventilation equipment according to the present invention includes a window frame formed with a mounting hole penetrating from outdoor side to indoor side, a casing which can be fastened to or unfastened from the mounting hole of the window frame, an outdoor air suction opening formed at a position of the outdoor side surface of the casing, an outdoor air exhaust opening formed at a position of the indoor side surface of the casing, an outdoor air flow passage formed within the casing for interconnecting the outdoor air suction opening with the outdoor air exhaust opening to each other, a first fan provided in the outdoor air flow passage for inhaling outdoor air forcibly from the outdoor air suction opening and blowing it to the outdoor air exhaust opening, an indoor air suction opening formed at another position of the indoor side surface of the casing, an indoor air exhaust opening formed at another position of the outdoor side surface of the casing, an indoor air flow passage formed with a wall partitioned against the outdoor flow passage for interconnecting the indoor air suction opening with the indoor air exhaust opening to each other, and a second fan provided in the indoor air flow passage for inhaling indoor air forcibly from the indoor air suction opening and blowing it to the indoor air exhaust opening.

A first heat exchanger is provided in the outdoor air flow passage, and a second heat exchanger is provided in the indoor air flow passage at the position corresponding to the first heat exchanger.

Moreover, the first heat exchanger or the second heat exchanger includes a heat exchange plate adjoining the wall and a plurality of heat exchange fins extending from the heat exchange plate on each flow passage.

Furthermore, an indoor air circulating opening for inhaling indoor air to the outdoor air flow passage is formed at still another position of the inside surface of the casing, and a switching means for selectively opening or closing the outdoor air suction opening and the indoor air circulating opening is provided within the casing.

The switching means is provided with a damper having a first switching portion formed with a plurality of first communicating openings adjoining the inside surface of the indoor air circulating opening which can communicate with the indoor air circulating opening, a second switching portion formed with a plurality of second communicating openings adjoining the inside surface of the outdoor air suction opening for communicating with the outdoor air suction opening, and a connecting portion for opening selectively the indoor air circulating opening or the outdoor air suction opening by connecting the first switching portion with the second switching portion to each other, and sliding the first switching portion and the second switching portion together.

Furthermore, the second switching portion is formed with a third communicating opening which can communicate with the indoor air exhaust opening for switching the outdoor air suction opening and the indoor air exhaust opening together.

Furthermore, the outdoor air flow passage includes a cleaning filter which can be inserted from the outside of the casing and is detachable, and solar cell for supplying power is provided on the window glass which is provided in the window frame.

Furthermore, a sliding groove extending from indoor side to outdoor side is formed on the inside of the mounting hole, and a sliding protrusion for allowing sliding insertion of the casing into the sliding groove toward the inside of the mounting hole is formed on the lateral side of the casing.

A microprocessor having a gas detecting sensor which can detect the content of harmful gases contained in indoor air, thereby controlling the operation of the first fan and the second fan, is provided in the indoor side surface of the window frame.

According to another aspect of the present invention, a window having ventilation equipment includes a window frame formed with a separation passage. between outdoor window glass and indoor window glass, a first mounting hole penetrating from outdoor side to indoor side at a position of the window frame, the inside of which can communicate with the separation passage, a second mounting hole penetrating from outdoor side to indoor side at another position of the window frame, the inside of which can communicate with the separation passage, a first casing inserted into the first mounting hole, and formed with a first indoor air flow opening which is opened toward indoor side and a first outdoor air flow opening which is opened toward outdoor side, a second casing inserted into the second mounting hole, and formed with a second indoor air flow opening which is opened toward indoor side and a second outdoor air flow opening which is opened toward outdoor side, a fan provided in the inside of the first casing for blowing from the inside of the first casing to the second casing through the separation passage, and a switching means respectively provided in the first indoor air flow opening and the first outdoor air flow opening, as well as the second indoor air flow opening and the second outdoor air flow opening.

The switching means includes a switching portion provided on the inside surface of each flow opening respectively, and formed with a communicating opening which can communicate with the flow opening, a protrusion sill protruded on a side of the switching portion, a screw axis penetrating through the protrusion sill, and engaged with the protrusion sill, and a reciprocal rotating motor for sliding the switching portion with reciprocal rotation of the screw axis. Moreover, a cleaning filter is inserted at the location adjoining the entrance of the separation passage of the first casing.

Furthermore, a sliding groove extending from indoor side to outdoor side is formed on the inside of the first mounting hole or the second mounting hole, and a sliding protrusion for allowing sliding insertion of the first casing or the second casing respectively into the sliding groove toward the inside of the first mounting hole or the second mounting hole is formed on the lateral side of the first casing or the second casing.

Furthermore, a door frame for allowing opening/closing of the indoor window glass or the outdoor window glass is provided in the window frame, and solar cell for supplying power is provided on the indoor window glass. Moreover, a microprocessor having a gas detecting sensor which can detect the content of harmful gases contained in indoor air, thereby controlling the operation of the fan, is provided in the indoor side surface of the window frame.

DETAILED DESCRIPTION OF THE INVENTION

Hereinafter, preferred embodiments of the present invention will be described in detail with reference to the attached drawings. The same reference numeral illustrated in each drawing will indicate the same member functioning in a similar way. Two preferred embodiments according to the present invention will be described separately in the following.

First Embodiment

Figure 1:
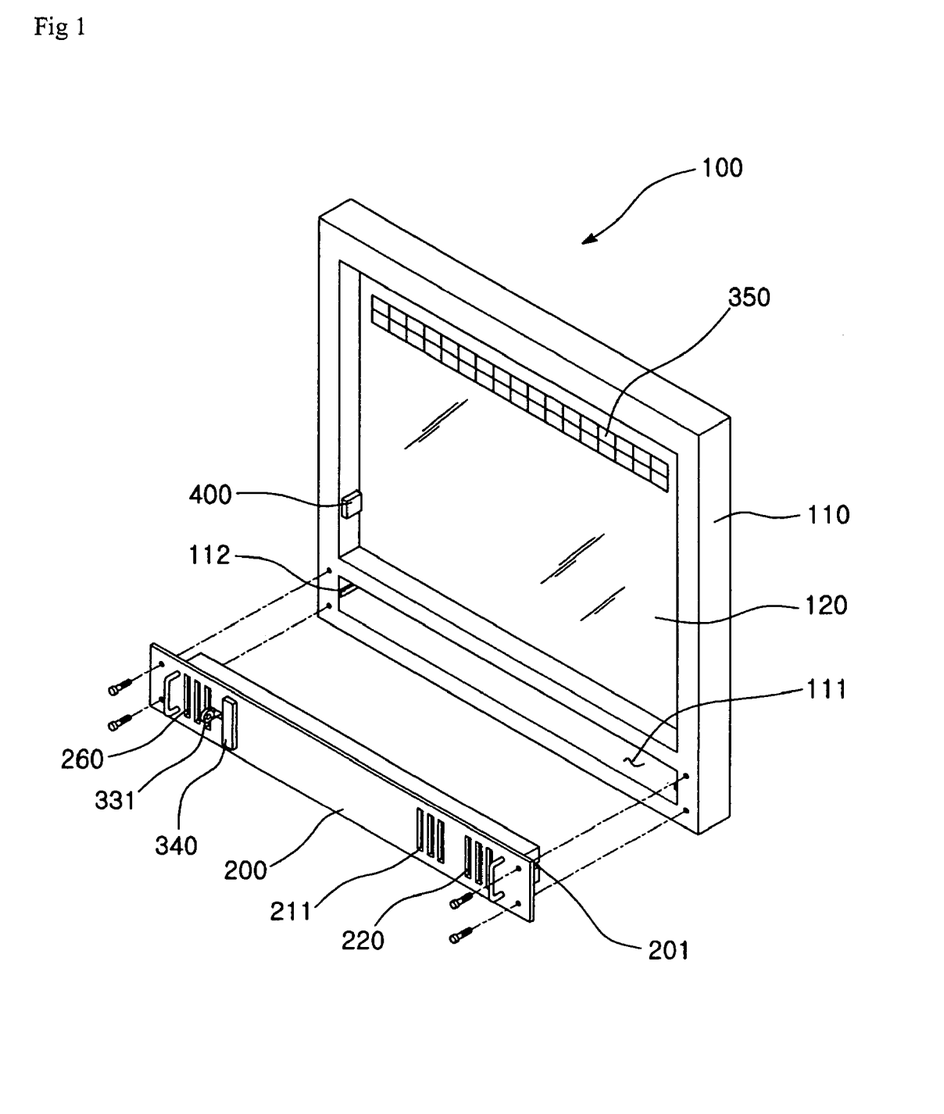
FIG. 1 is a perspective view showing a window having ventilation equipment according to the first embodiment of the present invention.

As shown in FIG. 1, a window having ventilation equipment 100 according to the present invention includes window frame 110 which is provided for fixing to the wall of a building, window glass 120 which is mounted on the window frame 110, and casing 200 which is provided in the window frame 110 in a detachable way.

At the bottom of window frame 110, mounting hole 111 penetrating from outdoor side to indoor side is formed, and casing 200 is inserted into mounting hole 111 for installation. Also, sliding groove 112 extending from outdoor side to indoor side is formed on the inside of mounting hole 111 for providing casing 200, and sliding protrusion 201 for allowing sliding insertion of casing 200 into sliding groove 112 toward the inside of mounting hole 111 is formed on both lateral sides of casing 200.

Figure 2:
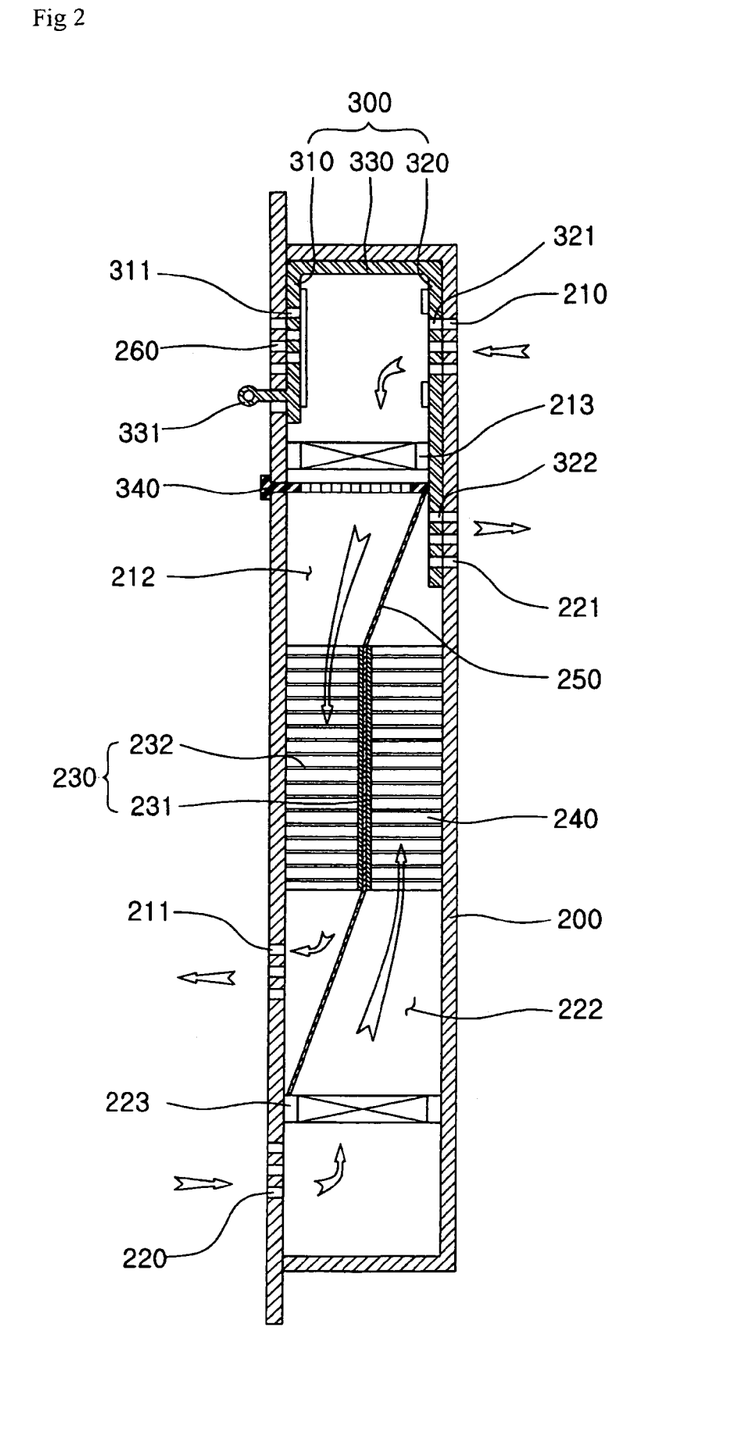
FIG. 2 is a cross-sectional view showing the state of outdoor air suction and indoor air exhaust in the ventilation equipment according to the first embodiment of FIG. 1.
Figure 3:
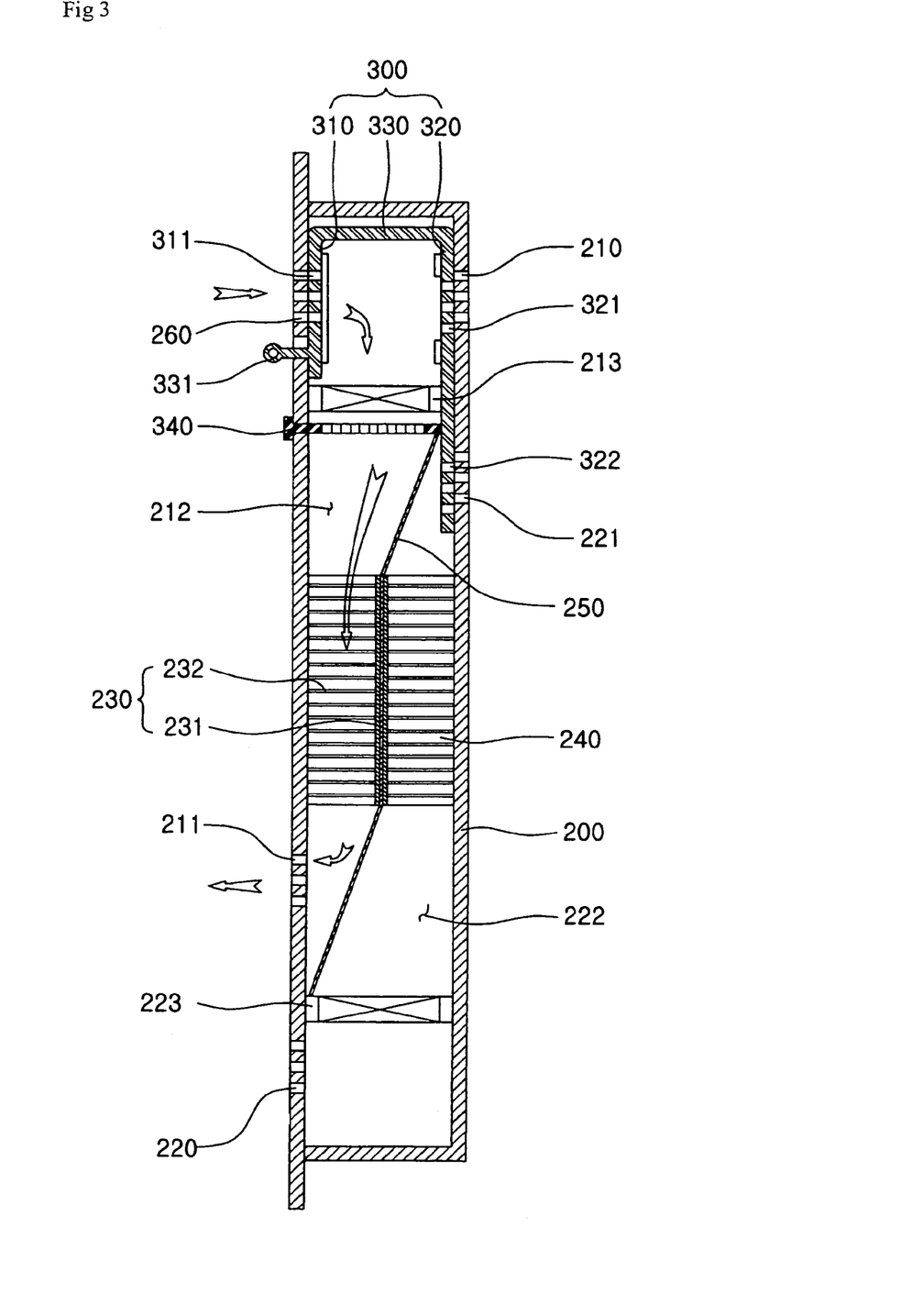
FIG. 3 is a cross-sectional view showing the state of indoor air circulation in the ventilation equipment according to the first embodiment of FIG. 1.

As shown in FIG. 2 and FIG. 3, casing 200 is formed with two flow passages 212 and 222 which are partitioned by partition wall 250 provided with an inclination in inside. One of these flow passages 212 is an outdoor air flow passage 212 which is mainly provided for inhaling outdoor air from outdoor side to supply into indoor side, and the other is indoor air flow passage 222 for inhaling indoor air from indoor side to exhaust to outdoor side. Here, outdoor air flow passage 212 can implement the function of circulating indoor air in a separate way.

More specifically, outdoor air suction opening 210 as an entrance of outdoor air flow passage 212 is formed at a position of the outdoor side surface of casing 200, outdoor air exhaust opening 211 as an exit of outdoor air suction opening 210 is formed in the diagonal direction of outdoor air suction opening 210 on the indoor side surface of casing 200.

Moreover, first fan 213 for inhaling outdoor air forcibly from outdoor air suction opening 210 and blowing it forcibly to outdoor air exhaust opening 211 is provided to inhale outdoor air and supply into indoor side, between outdoor air suction opening 210 and the tip of partition wall 250 of outdoor air flow passage 212. In addition, a cleaning filter which is installed in a removable way by inserting from the indoor side of casing 200 in the downstream of first fan 213 in outdoor air flow passage 212.

Subsequently, indoor air suction opening 220 as an entrance of indoor air flow passage 222 is formed on the lateral side of outdoor air exhaust opening 211 on the indoor side surface of casing 200, and indoor air exhaust opening 221 as an exit of indoor air flow passage 222 is formed in the diagonal direction of indoor air suction opening 220 on the outdoor side surface of casing 200, and second fan 223 for inhaling indoor air forcibly from indoor air suction opening 220 and blowing it to indoor air exhaust opening 221 is formed on this indoor air flow passage 222.

On the other hand, indoor air circulating opening 260 for guiding the inflow of indoor air to outdoor air flow passage 212 is formed to circulate indoor air in casing 200, at the location corresponding to outdoor air suction opening 210 on the indoor side surface of casing 200.

Accordingly, outdoor air is flowed in outdoor air flow passage 212 when outdoor air suction opening 210 is opened, and indoor air is flowed in outdoor air flow passage 212 when outdoor air suction opening 210 is closed and indoor air circulating opening 260 is opened. For this selective operation, a switching means is provided in the inside of casing 200 in order to open/close outdoor air suction opening 210 or indoor air circulating opening 260 selectively.

The switching means includes first switching portion 310 having a plate body which is formed with a plurality of first communicating openings 311 adjoining the inside surface of indoor air circulating opening 260 for communicating with the indoor air circulating opening 260, and second switching portion 320 having a plate body which is formed with a plurality of second communicating openings 321 adjoining the inside surface of outdoor air suction opening 210 for communicating with outdoor air suction opening 210, and it is provided with damper 300 having connecting portion 330 for opening indoor air circulating opening 260 or outdoor air suction opening 210 selectively by connecting first switching portion 310 and second switching portion 320 to each other, and sliding first switching portion 310 and second switching portion 320 together.

Moreover, the third communicating opening 322 for switching indoor air exhaust opening 221 together with outdoor air exhaust opening 211, which extends to the middle portion of casing 200 more than first switching portion 310, is formed in second switching portion 320 of damper 300.

Therefore, when damper 300 slides in a direction, first communicating opening 311 of first switching portion 310 communicates with indoor air circulating opening 260 while outdoor air suction opening 210 and indoor air exhaust opening 221 are closed, as shown in FIG. 3. Furthermore, when damper 300 slides in the other direction, second communicating opening 321 of second switching portion 320 communicates with outdoor air suction opening 210, and third communicating opening 322 communicates with indoor air exhaust opening 221 while indoor air circulating opening 260 is closed by first switching portion 310.

In order to perform such an operation, it is provided with control lever 331 protruding outward from casing 200 and long guide hole 332 is formed on the inside surface of casing 200 for moving control lever 331 from one direction to the other direction.

Here, outdoor air flow passage 212 and indoor air flow passage 222 adjoining each other are formed by interposing partition wall 250. Accordingly, when there is the temperature difference in the airs flowing through respective flow passages 212 and 222, heat will be mutually exchanged by the temperature difference in the airs. At this time, heat exchangers 230 and 240 are provided for improving the heat exchange efficiency more effectively.

Such heat exchangers 230 and 240 are provided with first heat exchanger 230 which is installed in outdoor air flow passage 212, and second heat exchanger 240 which is installed in indoor air flow passage 222 at the position corresponding to first heat exchanger 230. Heat exchanger 230 and the heat exchanger 240 have the same construction, and each of them is constructed with heat exchange plate 231 adjoining partition wall 250 and a plurality of heat exchange fins 232 extending from heat exchange plate 231 to each flow passage.

Hereinafter, the operation of a window having ventilation equipment having the above-mentioned construction according to the first embodiment of the present invention will be described.

The window having ventilation equipment according to the first embodiment of the present invention performs the function of air conditioning or air cleaning selectively. For explaining the operation, two operation modes will be described separately in the following.

The function of air conditioning includes the state of operation, wherein outdoor air is filtered and inhaled into a room and indoor air is forcibly exhausted to the outdoor side, and the inhaled outdoor air into the room uses heat exchange between indoor air and outdoor air to approach the level of indoor air temperature as much as possible.

In this operation mode as shown in FIG. 2, both outdoor air suction opening 210 and indoor air exhaust opening 221 are opened by second switching portion 320 of damper 300, and indoor air circulating opening 260 is closed by first switching portion 310.

In this condition, when first fan 213 and second fan 223 start to operate, outdoor air is inhaled from outdoor air suction opening 210 and flows through outdoor air flow passage 212 by operating first fan 213, and indoor air is inhaled from indoor air suction opening 220 and flows through indoor air flow passage 222. At this point, the inhaled outdoor air is purified in advance to eliminate the pollutants in outdoor air while passing through cleaning filter 340.

For the inhaled outdoor air, heat exchange is accomplished by indoor air passing through indoor air flow passage 222, first heat exchanger 230, and second heat exchanger 240 while passing through outdoor air flow passage 212. Accordingly, the inhaled outdoor air flows into the room under the condition of about the same temperature compared to indoor air, since it flows under the condition of absorbing the heat of indoor air. Accordingly, temperature reduction caused by an intake of outdoor air can be minimized in the room, thereby preventing the loss of additional energy.

Next, as shown in FIG. 3, the function of air cleaning is performed by manipulating control lever 331 in such a manner that both outdoor air suction opening 210 and indoor air exhaust opening 221 are closed by second switching portion 320 of damper 300, and indoor air circulating opening 260 is opened by first switching portion 310. And first fan 213 starts to operate for inhaling indoor air through indoor air circulating opening 260.

At this point, the function of air cleaning is performed in such a manner that indoor air being purified through cleaning filter 340 flows into outdoor air flow passage 212, and indoor air passing through outdoor air flow passage 212 is again exhausted through outdoor air exhaust opening 211. On the other hand, cleaning filter 340 is reusable for installation by taking out for cleaning periodically since it is a retachable type.

On the other hand, solar cell 350 for supplying power is provided on window glass 120 which is provided in window frame 110, thereby operating fans 213 and 223 provided in casing 200 by means of the power supplied from solar cell 350 without individual external power source. At this point, the control device for supplying power can be provided in casing 200 in a separate way. Such a method of supplying power using solar cell 350 is a publicly known conventional technology. It will not be described. in detail in the present embodiment; however, it can be easily implemented by those skilled in the art.

Furthermore, microprocessor 400 provided with a gas detecting sensor which can detect the content of harmful gases contained in indoor air, thereby controlling the operation of first fan 213 and second fan 223, is provided in the indoor side surface of window frame 110. Therefore, when a reference value is set in microprocessor 400 and the content of harmful gases detected by the gas detecting sensor (sulfur dioxide, carbon dioxide, cigarette smoke, VOC, formaldehyde, radon, etc.) is greater than the reference value, the exhaust and cleaning of harmful gases, and the function of air conditioning can be performed automatically by operating first fan 213 and second fan 223.

Moreover, the temperature of indoor air can be detected by a temperature detecting sensor when the temperature detecting sensor is provided, and microprocessor 400 can perform the function of air conditioning by comparing the set reference value with the detected temperature value to control first fan 213 and second fan 223.

The installation and manipulation of such a microprocessor can be more conveniently used when it is controlled together with home automation system which is connected to the wire/radio network.

Second Embodiment

Figure 4:
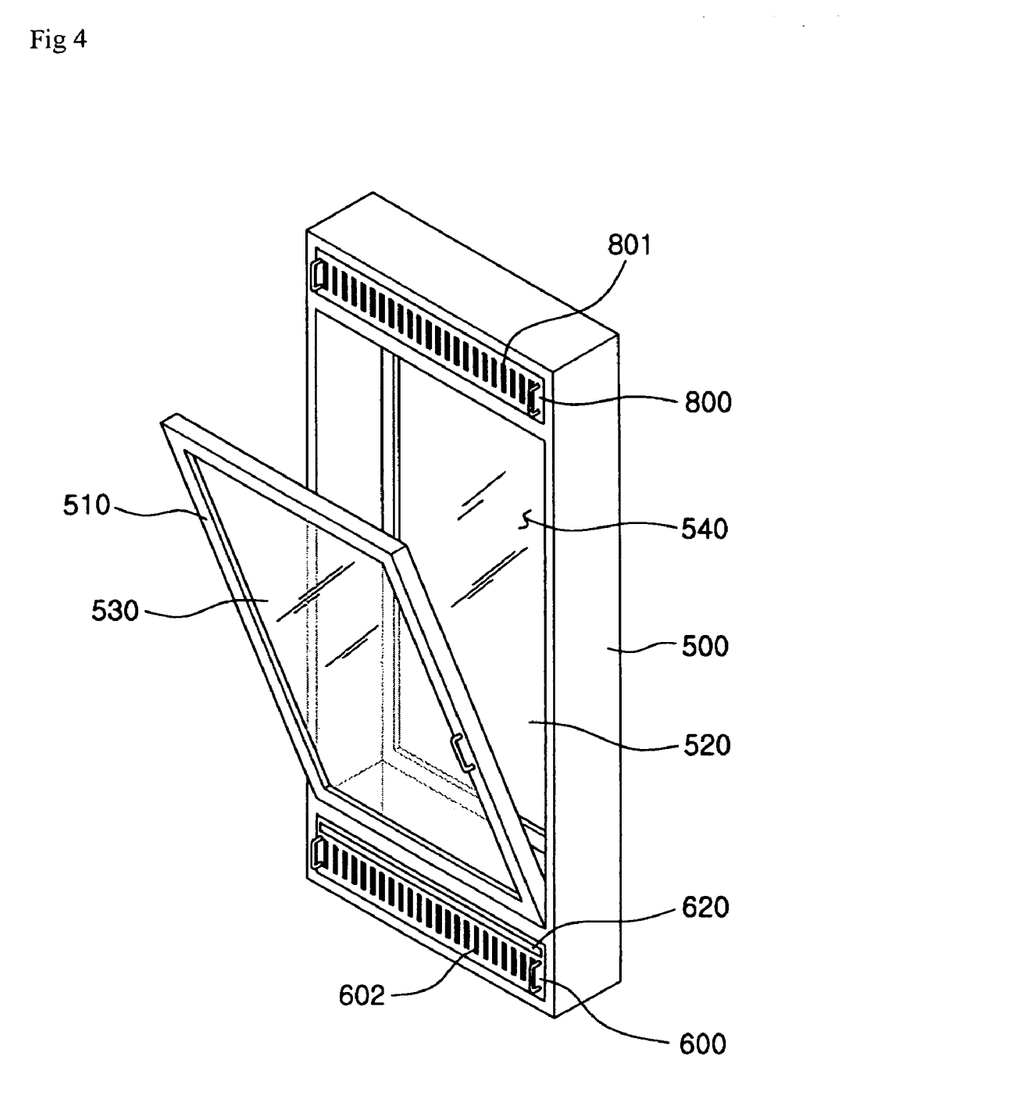
FIG. 4 is a perspective view showing a window having ventilation equipment according to the second embodiment of the present invention.
Figure 5:
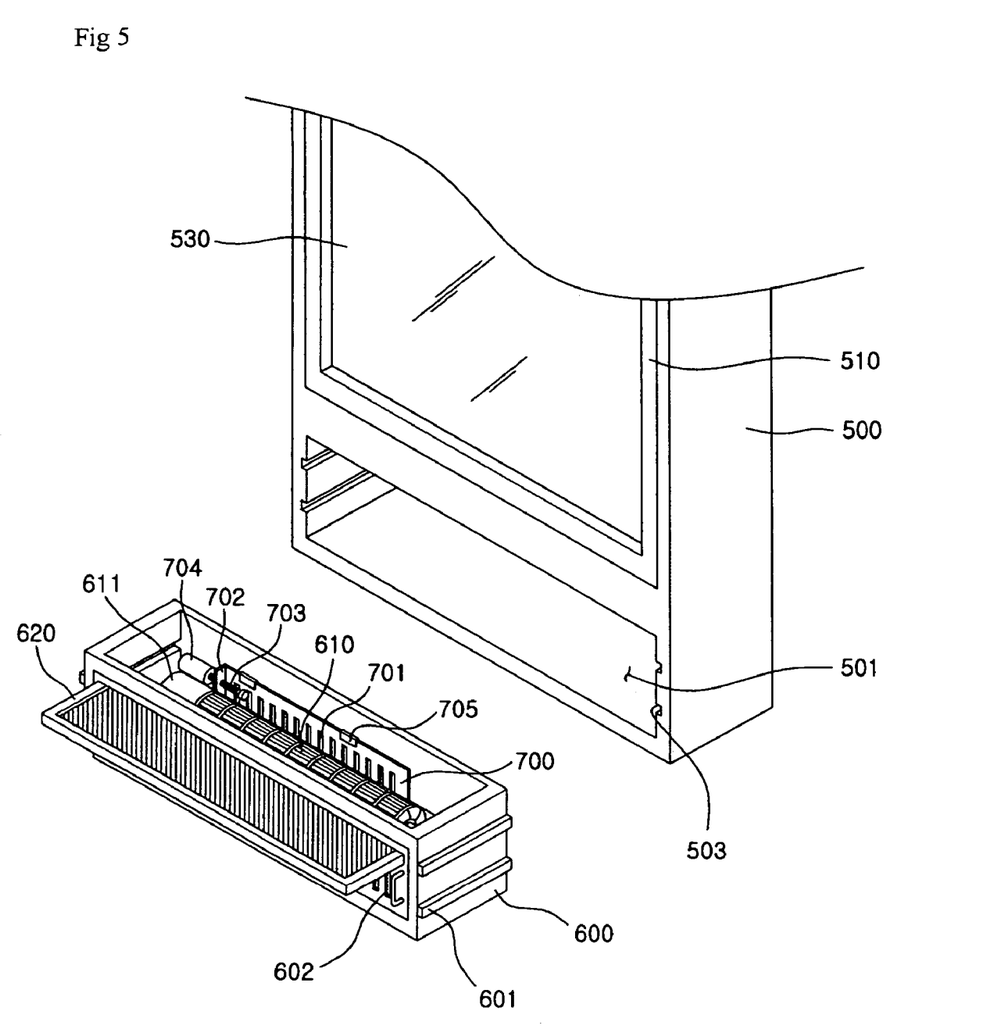
FIG. 5 is a perspective view showing a casing provided in the ventilation equipment according to the embodiment of FIG. 4.

In the second embodiment of the window having ventilation equipment according to the present invention, window frame 500 is separated by outdoor window glass 520 and indoor window glass 530, and separation passage 540 is formed between the glasses as shown in FIG. 4 and FIG. 5. Both outdoor window glass 520 and indoor window glass 530 are mounted on door frame 510 which is provided in window frame 500 for opening or closing from the outside or the inside.

Window frame 500 is provided with first mounting hole 501 penetrating from outdoor side to indoor side at the lower portion, and the upper inside surface of which is opened to communicate with the bottom of separation passage 540, and second mounting hole 502 penetrating from outdoor side to indoor side at the upper portion, the inside of which communicates with the top of separation passage 540.

Moreover, first mounting hole 501 is provided with first casing 600 which is formed with first indoor air passage 602 opened toward indoor side and first outdoor air passage 603 opened toward outdoor side respectively on the front/rear side thereof, and second mounting hole 502 is provided with second casing 800 which is formed with second indoor air passage 801 opened toward indoor side and second outdoor air passage 802 opened toward outdoor side respectively on the front/rear side thereof.

Here, for the installation of first casing 600 and second casing 800, sliding groove 503 extending from indoor side to outdoor side is formed on the inside of first mounting hole 501 and second mounting hole 502, and sliding protrusion 601 for allowing sliding insertion of first casing 600 and second casing 800 respectively into sliding groove 503 toward the inside of first mounting hole 501 and second mounting hole 502 is formed on the lateral side of first casing 600 and second casing 800. Alternatively, the location of the sliding groove and the sliding protrusion can be interchanged as described in the first embodiment.

Figure 6:
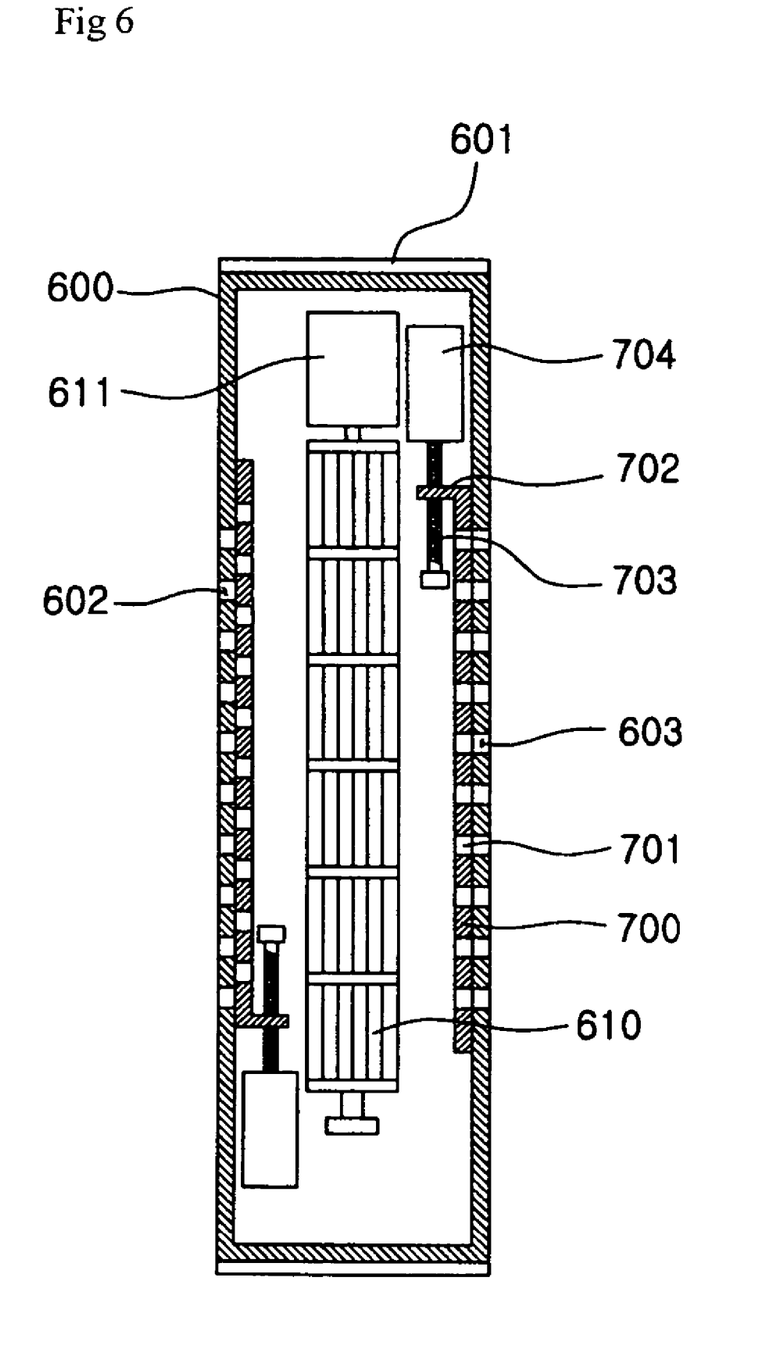
FIG. 6 is a cross-sectional view showing a casing provided in the ventilation equipment according to the embodiment of FIG. 5.

As shown in FIG. 5 and FIG. 6, fan 610 for inhaling outdoor air or indoor air forcibly to the inside of first casing 600 and blowing it to the bottom of separation passage 540 is provided in first casing 600, and cleaning filter 620 which can be replaced by sliding insertion into the upper portion of first casing 600 is provided on the top side of fan 610.

The internal structure of second casing 800 is identical to that of first casing 600, but a fan is not installed. However, a separate fan and/or a cleaning filter can be installed as in first casing 600 if required.

Moreover, a plurality of switching means are provided respectively in first indoor air flow opening 602 and first outdoor air flow opening 603, as well as in second indoor air flow opening 801 and second outdoor air flow opening 802. Since the switching means provided in each flow opening is identical in the construction, except in the direction of installation, each of them will not be described separately.

The switching means are provided on the inside surface of each flow opening 602, 603, 801 and 802, and each of them comprises switching portion 700 provided respectively on the inside surface of each flow opening 602, 603, 801 and 802, and formed with communicating opening 701 which can communicate with flow openings 602, 603, 801 and 802; protrusion sill 702 protruded on a side of switching portion 700; screw axis 703 penetrating through protrusion sill 702, and engaged with protrusion sill 702; and reciprocal rotating motor 704 for sliding switching portion 700 with reciprocal rotation of screw axis 703. Guide rail 705 for sliding switching portion 700 is respectively provided on the upper and lower sides of these flow openings 602, 603, 801 and 802 within casings 600 and 800.

Hereinafter, the operation of a window having ventilation equipment having the above-mentioned construction according to the second embodiment of the present invention will be described.

The window of this embodiment will operate in three major operation mode. These operation modes include outdoor air suction, indoor air exhaust, indoor air circulation and outdoor air circulation. Each of these operation modes will be described in the following.

Figure 7:
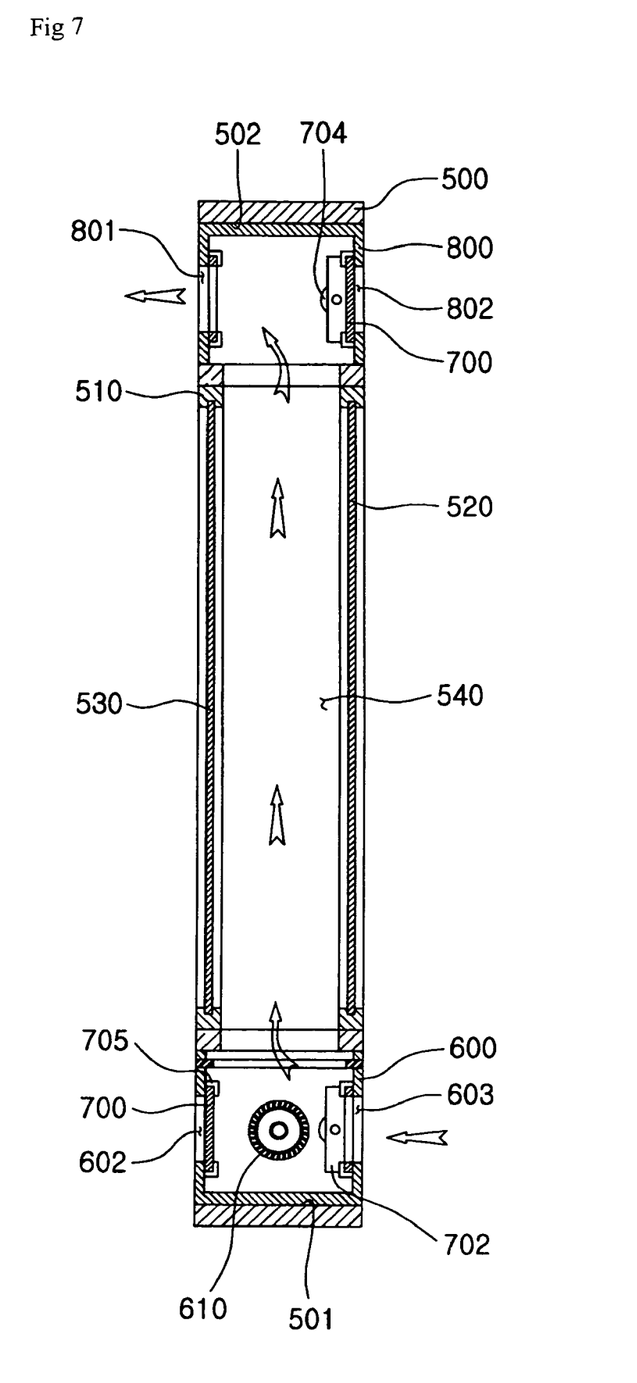
FIG. 7 is a cross-sectional view showing the state of outdoor air suction in FIG. 5.

For the operation of outdoor air suction, first outdoor air flowing opening 603 of first casing 600 is opened, and second indoor air flow opening 801 of second casing 800 is opened as shown in FIG. 7. At the same time, first indoor air flow opening 602 of first casing 600 and second outdoor air flow opening 802 of second casing 800 are closed. The open and close operation is performed respectively using the switching means which is provided for each of them. When fan 610 operates in this condition, outdoor air is inhaled through outdoor air flow opening 603 and then flows through cleaning filter 620 to separation passage 540.

At this point, the inhaled outdoor air flowing into separation passage 540 is heated by solar radiation which is stored in separation passage 540 and then flows to the bottom of second casing 800, and then passes the inside of second casing 800 to be inhaled into indoor side through second flow opening 801 of second casing 800. In other words, the inhaled outdoor air flows indoor under the condition of being heated and purified. Here, separation passage 540 functions as a heating means for heating up the inhaled outdoor air as mentioned above. Therefore, the loss of additional energy for heating up the inhaled cold outdoor air in the heating system can be minimized in the winter season.

Figure 8:
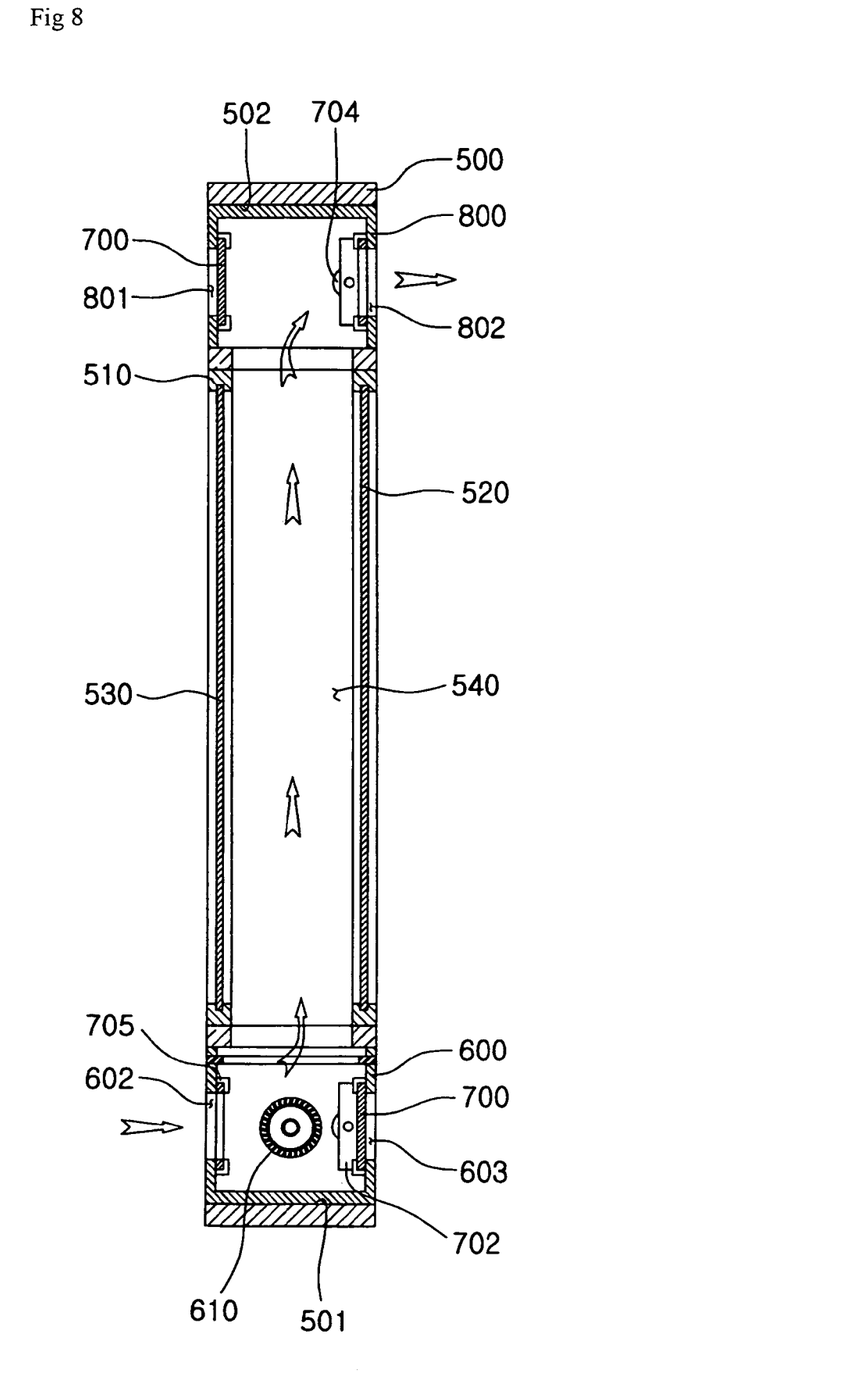
FIG. 8 is a cross-sectional view showing the state of indoor air exhaust in FIG. 5.

Next, for the operation of indoor air exhaust, first indoor air flowing opening 602 of first casing 600 is opened and second outdoor air flow opening 802 of second casing 800 is opened as shown in FIG. 8. At the same time, first outdoor air flow opening 603 of first casing 600 and second indoor air flow opening 801 of second casing 800 are closed.

Subsequently, when fan 610 operates in this condition, indoor air is inhaled through indoor air flow opening 602 and then flows through cleaning filter 620 to separation passage 540.

Furthermore, the inhaled indoor air flowing into separation passage 540 flows up to second casing 800 through separation passage 540, and is exhausted to the outside through second outdoor air flow opening 802 of second casing 800 after passing through the inside of second casing 800. Such an indoor air exhaust operation is performed when ventilation is required for indoor side.

Figure 9:
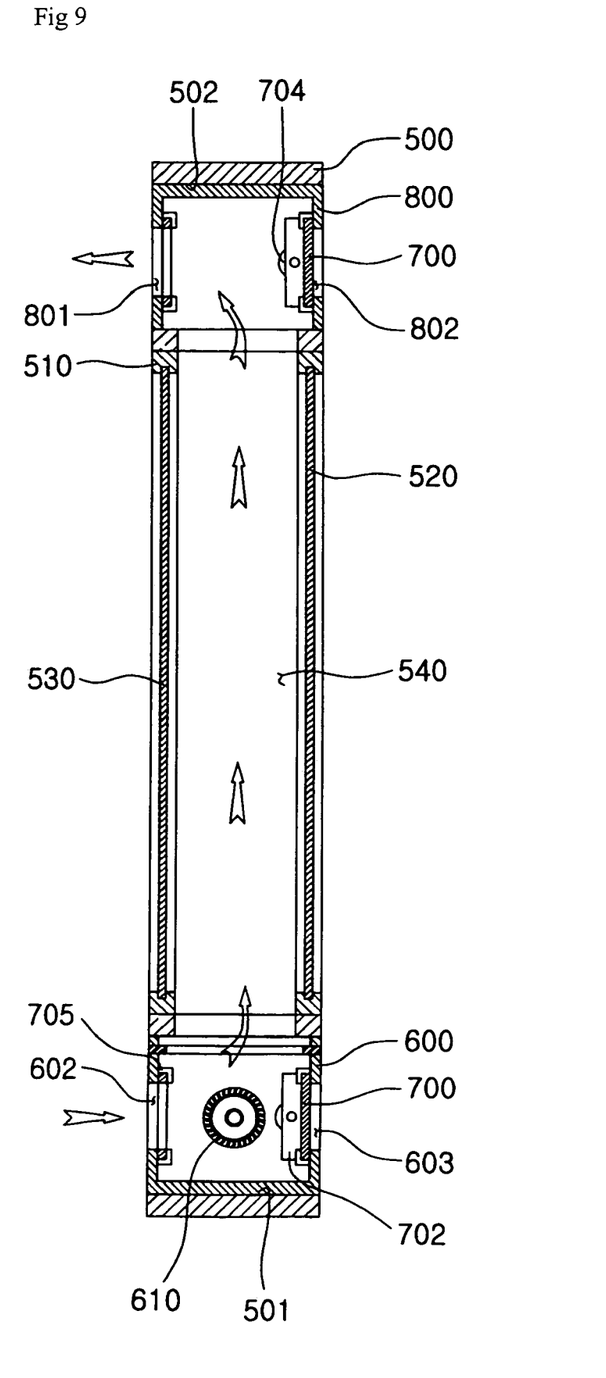
FIG. 9 is a cross-sectional view showing the state of indoor air circulation in FIG. 5.

Subsequently, for the operation of indoor air circulation, first indoor air flowing opening 602 of first casing 600 is opened and second indoor air flow opening 801 of second casing 800 is opened as shown in FIG. 9. At the same time, first outdoor air flow opening 603 of first casing 600 and second outdoor air flow opening 802 of second casing 800 are closed.

When fan 610 operates in this condition, indoor air is inhaled through first indoor air flow opening 602 and then flows into separation passage 540 through cleaning filter 620, and the inhaled indoor air flowing into separation passage 540 is heated up by solar radiation which is stored in separation passage 540 and flows into second casing 800. Then it is inhaled into the indoor side through second indoor air flow opening 801 of second casing 800 after passing through the inside of second casing 800. Therefore, indoor air circulates continuously while being heated up and purified. The main purpose of this operation is to improve the efficiency of indoor air heating up by performing indoor air purification and heating up by means of solar radiation in the winter season.

Figure 10:
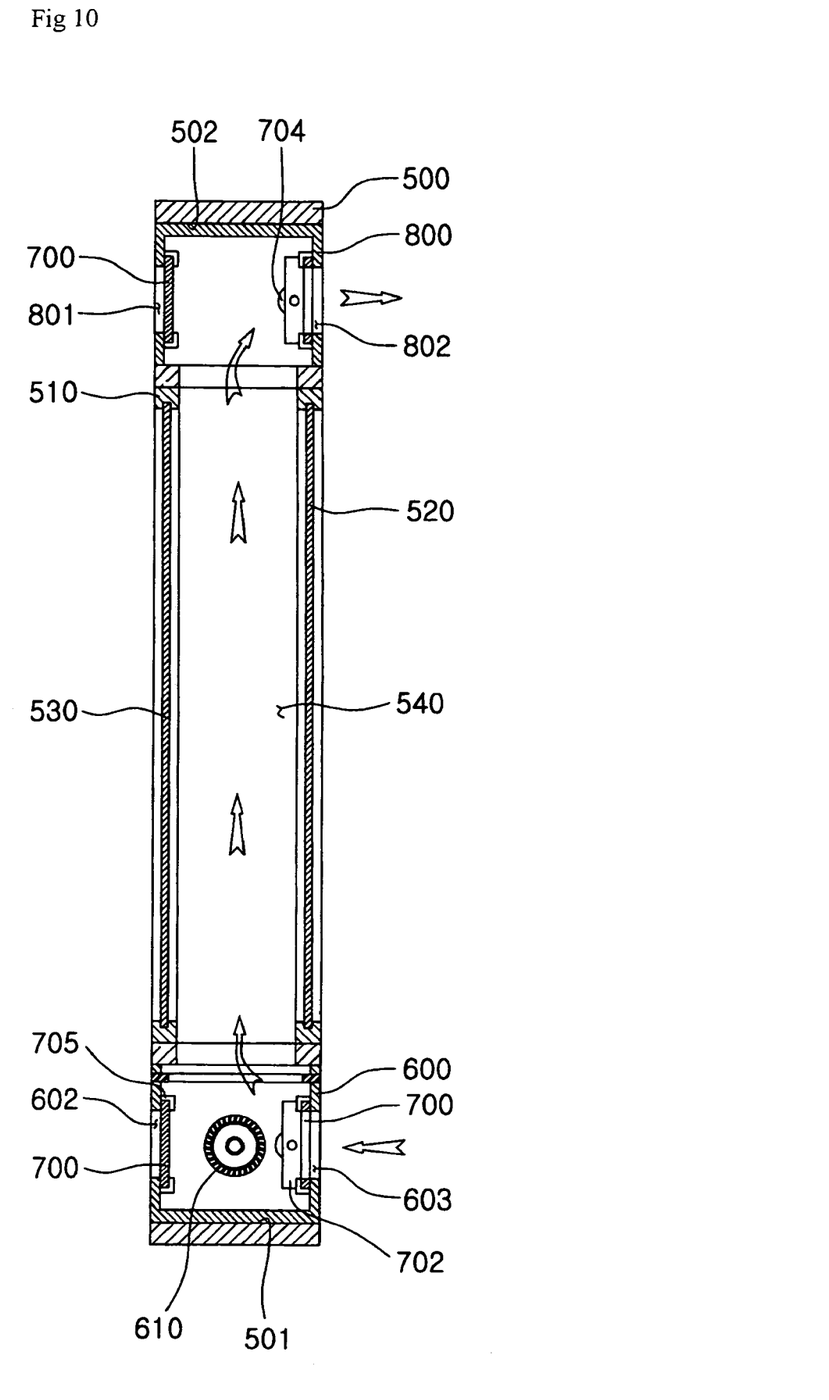
FIG. 10 is a cross-sectional view showing the state of outdoor air circulation in FIG. 5.

Finally, outdoor air circulation can be used for preventing heat from outside such as intense solar heat as shown in FIG. 10. For this operation, first indoor air flowing opening 602 of first casing 600 is closed, and second indoor air flow opening 801 of second casing 800 is closed. At the same time, first outdoor air flow opening 603 of first casing 600 and second outdoor air flow opening 802 of second casing 800 are opened.

When fan 610 operates in this condition, outdoor air is inhaled through fist outdoor air flow opening 603 and then flows through cleaning filter 620 to separation passage 540, and the inhaled outdoor air flowing into separation passage 540 cools down the heat induced by solar radiation which is stored in separation passage 540 and then flows to second casing 800. Then it is exhausted to the outside through second outdoor air flow opening 802 of second casing 800 after passing through the inside of second casing 800 for improving the efficiency of cooling system by reducing solar radiant heat which is stored in the window for cooling down in the summer season.

These operation modes can be performed respectively while changing each mode if required. In other words, outdoor air can be inhaled again after cleaning indoor air for a fixed period of time, or outdoor air can be inhaled after exhausting indoor air. Moreover, outdoor air can be only circulated if required. Each manipulation can be applied variably for the season.

Furthermore, wireless manipulation using remote controller or the like can be used by an operator for variable manipulation of the above-mentioned operation, or a wired manipulation apparatus can be used separately. Alternatively, automatic manipulation using a microcomputer can be used as in the first embodiment. Moreover, it can be more efficiently used by controlling together with home automation system.

Gas and temperature detecting sensors are provided with the above-mentioned microprocessor for detecting indoor pollution level and temperature as described in the first embodiment, and its manipulation will be determined by the detection values. Moreover, it can operate without separate external power source by providing solar cell for supplying power on a window glass, and it can be used together with the home automation system which is connected to the wire/radio network.

The window having ventilation equipment according to the present invention, as described above, can maintain indoor atmosphere in an optimal condition by purifying, ventilating and/or thermal exchanging indoor air when it is required. Furthermore, automatic cleaning and atmosphere conditioning are possible by using a microprocessor, and it has excellent effectiveness in the utility factor by supplying power by itself using solar cell.

Moreover, ventilation equipment maintenance can be easily accomplished since the ventilation equipment is detachable from the inside of the window frame; besides, it has a good appearance when installed, as well as excellent effectiveness in construction work and installation since the ventilation equipment can be freely installed without constraint and the existing window frame can be replaced with no modification of the building structure while working on the window frame.

While the invention has been described with reference to specific embodiments chosen for purpose of illustration, it is apparent that numerous modifications could be made thereto by those skilled in the art without departing from the basic concept and scope of the invention. Accordingly, if the modifications include the technical scope of the invention, they should be regarded as being in the same category of the present invention.

What is claimed is:

1. A window having ventilation equipment comprising:
    a window frame formed with a mounting hole penetrating from outdoor side to indoor side;
    a casing which can be fastened to or unfastened from the mounting hole of said window frame;
    an outdoor air suction opening formed at a position of the outdoor side surface of said casing;
    an outdoor air exhaust opening formed at a position of the indoor side surface of said casing;
    an outdoor air flow passage formed within said casing for interconnecting said outdoor air suction opening with said outdoor air exhaust opening to each other;
    a first fan provided in said outdoor air flow passage for inhaling outdoor air forcibly from said outdoor air suction opening and blowing it to said outdoor air exhaust opening;
    an indoor air suction opening formed at another position of the indoor side surface of said casing;
    an indoor air exhaust opening formed at another position of the outdoor side surface of said casing;
    an indoor air flow passage formed with a wall partitioned against said outdoor flow passage for interconnecting said indoor air suction opening with said indoor air exhaust opening to each other; and
    a second fan provided in said indoor air flow passage for inhaling indoor air forcibly from said indoor air suction opening and blowing it to said indoor air exhaust opening,
    wherein a first heat exchanger is provided in said outdoor air flow passage and a second heat exchanger is provided in said indoor air flow passage at the position corresponding to said first heat exchanger, and wherein said first heat exchanger and said second heat exchanger are made of a heat exchange plate adjoining the partition wall and a plurality of heat exchange fins extending from said heat exchange plate on each said flow passage.

2. The window having ventilation equipment of claim 1, wherein an indoor air circulating opening for inhaling indoor air to said outdoor air flow passage is formed at still another position of the indoor side surface of said casing, and a switching means for selectively opening or closing said outdoor air suction opening and said indoor air circulating opening is provided within said casing.

3. The window having ventilation equipment of claim 2, wherein said switching means is provided with a damper comprising:
- a first switching portion formed with a plurality of first communicating openings adjoining the inside surface of said indoor air circulating opening which can communicate with said indoor air circulating opening;
- a second switching portion formed with a plurality of second communicating openings adjoining the inside surface of said outdoor air suction opening for communicating with said outdoor air suction opening; and
- a connecting portion for opening selectively said indoor air circulating opening or said outdoor air suction opening by connecting said first switching portion with said second switching portion to each other, and sliding said first switching portion and said second switching portion together.

4. The window having ventilation equipment of claim 3, wherein said second switching portion is formed with a third communicating opening which can communicate with said indoor air exhaust opening for switching said outdoor air suction opening and said indoor air exhaust opening together.

5. The window having ventilation equipment of claim 1, wherein said outdoor air flow passage includes a cleaning filter which can be inserted from the outside of said casing and is detachable.

6. The window having ventilation equipment of claim 1, wherein solar cell for supplying power is provided on window glass which is provided in said window frame.

7. The window having ventilation equipment of claim 1, wherein a microprocessor having a gas detecting sensor which can detect the content of harmful gases contained in indoor air, thereby controlling the operation of said first fan and said second fan, is provided in the indoor side surface of said window frame.

\* \* \* \* \*